United States Patent
Calo et al.

(10) Patent No.: US 10,380,105 B2
(45) Date of Patent: *Aug. 13, 2019

(54) QA BASED ON CONTEXT AWARE, REAL-TIME INFORMATION FROM MOBILE DEVICES

(71) Applicant: International Business Machines Corporation, Armonk, NY (US)

(72) Inventors: Seraphin Bernard Calo, Cortlandt Manor, NY (US); Douglas M Freimuth, New York, NY (US); Raghu Kiran Ganti, Elmsford, NY (US); James J. Fan, Mountain Lakes, NJ (US); Fan Ye, Ossining, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 168 days.

This patent is subject to a terminal disclaimer.

(21) Appl. No.: 13/912,058

(22) Filed: Jun. 6, 2013

(65) Prior Publication Data

US 2014/0365517 A1  Dec. 11, 2014

(51) Int. Cl.
*G06F 16/242* (2019.01)

(52) U.S. Cl.
CPC .................. *G06F 16/243* (2019.01)

(58) Field of Classification Search
CPC ......... G06F 17/30389; G06F 17/30401; G06F 17/30637; G06F 17/3066; G06F 16/243
(Continued)

(56) References Cited

U.S. PATENT DOCUMENTS 7,551,922 B2   6/2009   Roskowski et al.
7,756,827 B1   7/2010   Yung et al.
(Continued)

OTHER PUBLICATIONS

International Search Report of the International Searching Authority in corresponding International Application No. PCT/US2014/041029 dated Oct. 27, 2014.
(Continued)

*Primary Examiner* — Jensen Hu
(74) *Attorney, Agent, or Firm* — Patent Portfolio Builders PLLC

(57) ABSTRACT

A common infrastructure collects data from a plurality of mobile devices and traditional sensors at Internet scale to respond to natural language queries received at different applications. The infrastructure includes a semantic interpreter to translate the natural language query to a data request specification that is processed by the data collection system. The data collection system includes a phenomenon layer that expresses data and information needs in a declarative fashion and coordinates data collection and processing for queries. An edge layer manages devices, receives collection requirements from the backend layer, configures and instructs devices for data collection, and conducts aggregation and primitive processing of data. This layer contains network edge nodes, such as base stations in a cellular network. Each node manages a set of local data generating networked devices. The device agent data layer using common agents on the networked devices receives data collection instructions and performs data collection.

20 Claims, 3 Drawing Sheets

(58) Field of Classification Search
USPC .......................................................... 707/760
See application file for complete search history.

(56) References Cited

U.S. PATENT DOCUMENTS

| | | | |
|---|---|---|---|
| 8,170,800 B2 | 5/2012 | Aamodt et al. | |
| 2002/0026278 A1* | 2/2002 | Feldman | G08G 1/0104 701/117 |
| 2003/0058874 A1 | 3/2003 | Sahaya et al. | |
| 2004/0143385 A1* | 7/2004 | Smyth | G08G 1/0116 701/117 |
| 2004/0243533 A1* | 12/2004 | Dempster | G06F 17/30241 |
| 2005/0137781 A1* | 6/2005 | Hudson, Jr. | 701/117 |
| 2007/0094285 A1 | 4/2007 | Agichtein et al. | |
| 2008/0010259 A1 | 1/2008 | Feng et al. | |
| 2008/0195584 A1* | 8/2008 | Nath | G06F 17/30864 |
| 2008/0258880 A1 | 10/2008 | Smith et al. | |
| 2009/0043766 A1 | 2/2009 | Wang et al. | |
| 2009/0089044 A1* | 4/2009 | Cooper | G06F 17/275 704/9 |
| 2009/0216860 A1 | 8/2009 | Li et al. | |
| 2009/0224941 A1 | 9/2009 | Kansai et al. | |
| 2010/0023531 A1 | 1/2010 | Brisebois et al. | |
| 2010/0023952 A1 | 1/2010 | Sandoval et al. | |
| 2010/0131265 A1 | 5/2010 | Liu et al. | |
| 2010/0275179 A1 | 10/2010 | Mengusoglu et al. | |
| 2010/0286899 A1* | 11/2010 | Jain | G08G 1/127 701/119 |
| 2011/0047597 A1 | 2/2011 | Mahaffey et al. | |
| 2011/0153312 A1 | 6/2011 | Roberts | |
| 2011/0196852 A1* | 8/2011 | Srikanth et al. | 707/706 |
| 2011/0276951 A1 | 11/2011 | Jain | |
| 2012/0016678 A1 | 1/2012 | Gruber et al. | |
| 2012/0072481 A1 | 3/2012 | Nandlall et al. | |
| 2012/0101810 A1* | 4/2012 | Kennewick | G06Q 30/0261 704/9 |
| 2012/0136996 A1 | 5/2012 | Seo et al. | |
| 2012/0137254 A1 | 5/2012 | Cunningham et al. | |
| 2012/0201418 A1 | 8/2012 | Bellwood et al. | |
| 2013/0035930 A1 | 2/2013 | Ferrucci et al. | |
| 2013/0073576 A1* | 3/2013 | Lillethun | H04W 4/38 707/758 |
| 2013/0132434 A1* | 5/2013 | Scofield | G08G 1/0112 707/771 |
| 2013/0218445 A1* | 8/2013 | Basir | G08G 1/00 701/117 |

OTHER PUBLICATIONS

Written Opinion of the International Searching Authority in corresponding International Application No. PCT/US2014/041029 dated Oct. 27, 2014.

Albus, "The NIST Real-Time Control System(RCS)An Applications Survey", Proceedings of the AAAI Spring Symposium, 1995.

Anon, "IBM Continues to Increase its R&D Investments", HighTechNews.com, May 23, 2011.

B. Hull et al., "Cartel: a distributed mobile sensor computing system", In Proc. of SenSys, pp. 125-138, 2006.

Eckman et al., "Varieties of Interoperability in the Transformation of the Health Care Information Infrastructure", IBM Journal Systems, vol. 6, No. 1, 2007

J. Burke et al., "Participatory sensing", Workshop on World-Sensor-Web, co-located with ACM SenSys, 2006.

P. Dutta et al., "Demo abstract: Common sense: Participatory urban sensing using a network of handheld air quality monitors", In Proc. of ACM SenSys, pp. 349-350 (2009).

P. Mohan, V. Padmanabhan and R. Ramijee, "Nericell: mobile smartphones", In Proc. of ACM SenSys, pp. 323-336, 2008.

R. Ganti, F. Ye and H. Lei, "Mobile crowdsensing: Current state and future challenges", IEEE Communications Magazine, 49(11):32-39, 2011.

R. Ganti, N. Pham, H. Ahmadi, S. Nangia and T. Abdelzaher, "Greengps: A participatory sensing fuel-effient maps application", In Proc. of MobiSys, pp. 151-164, 2010.

S. B. Eisenman et al., "The bikenet mobile sensing system for cyclist experience mapping", In Proc. of SenSys, Nov. 2007.

Wu et al., "Challenges and Experience in Prototyping a Multi-Modal Stream Analytic and Monitoring Application on System S", VLDB '07, Sep. 23-28, 2007, Vienna, Austria.

Zhao et al., "Maritime Domain Awareness via Agent Learning and Collaboration", 15th ICCRTS, International Command and Control, Research and Technology Symposium, Santa Monica, California, Jun. 22-24, 2010.

International Preliminary Examination Report in Corresponding PCT Application PCT/US14/41029 dated Dec. 17, 2015.

Office Action dated Oct. 8, 2018 in related CN Application No. 20148003288.9 (all references from OA have previously been made of record).

* cited by examiner

QA BASED ON CONTEXT AWARE, REAL-TIME INFORMATION FROM MOBILE DEVICES

STATEMENT REGARDING FEDERALLY SPONSORED RESEARCH

The invention disclosed herein was made with U.S. Government support under Contract No. W911NF-06-3-0001 awarded by the U.S. Department of Defense. The Government has certain rights in this invention.

FIELD OF THE INVENTION

The present invention relates to data collection in networked devices.

BACKGROUND OF THE INVENTION

The use of networked based social networks, for example, Facebook, Twitter, FourSquare, and Google+ has steadily increased along with the use of smartphones equipped with sensors and Internet connectivity capabilities. The marriage of these technologies, smartphones and social networks, will likely yield applications that leverage the data collection capabilities of large numbers of smartphones by applications such as crowdsourcing. For example, real-time traffic monitoring for Google maps is enabled through individuals sharing their location and speed information from their smartphones. This integration also leverages social networking applications for disaster management. For example, an oil spill or other environmental disaster can be monitored by individuals by sharing pictures or other relevant information across a social networking site. A chemical spill or the air quality around a given disaster can be monitored similarly using, for example, air sampling equipment associated with the mobile devices.

The information obtained through the use of these technologies can be aggregated, processed, and then consumed by individuals or by decision makers and public agencies. Consumption of this information includes information retrieval and responding to queries or questions over the obtained information. In information retrieval and natural language processing (NLP), question answering (QA) is the task of automatically answering a question posed in natural language. To find the answer to a question, a QA computer program uses either a pre-structured database or a collection of natural language documents, e.g., a text corpus such as the World Wide Web or some local collection. Search collections vary from small local document collections through internal organization documents and compiled newswire reports to the World Wide Web.

QA research attempts to deal with a wide range of question types including, for example, fact, list, definition, How, Why, hypothetical, semantically constrained, and cross-lingual questions. In general, QA is dependent on having a good search corpus, i.e., the existence of documents containing the desired answer. Therefore, larger collection sizes correlate to better QA performance, unless the question domain is orthogonal to the collection. The notion of data redundancy in massive collections, such as the Web, creates a situation where nuggets of information are phrased in many different ways in differing contexts and documents. This yields two benefits. First, the burden on the QA system to perform complex NLP techniques to understand the text is lessened by having the right information appear in many forms. Second, correct answers can be filtered from false positives by relying on the correct answer to appear more times in the documents than instances of incorrect answers.

Closed-domain question answering deals with questions under a specific domain, e.g., medicine or automotive maintenance, and presents an easier task because NLP systems can exploit domain-specific knowledge frequently formalized in ontologies. Alternatively, closed-domain might refer to a situation where only a limited type of questions are accepted, such as questions asking for descriptive rather than procedural information. Open-domain question answering deals with questions about nearly anything and can only rely on general ontologies and world knowledge. On the other hand, these systems usually have much more data available from which to extract the answer.

SUMMARY OF THE INVENTION

Systems and methods in accordance with exemplary embodiment of the present invention provide context aware, real time information from mobile devices. A data collection framework is used to collect data, e.g., real time information, from the mobile devices. The data collection framework is a layered model that includes a question answering (QA) application layer, a backend layer, an edge collection layer and a data layer. The QA layer accepts a mixed corpus of inputs such as archived data, e.g. Wikipedia, and online data, e.g. blogs and feeds as well as real time information from mobile devices as an input to the mixed corpus.

A semantic interpreter is utilized in the QA application layer that translates an original question into a description of the data, e.g. specification of the data, that the data collection framework is used to capture. The data to collect are determined based on the content of the question and state information associated with the user asking the question. This state information includes a user profile. In one embodiment, domain dependent templates and policies are used in the semantic interpreter. These domain dependent templates describe what data are relevant for a given domain, e.g., a medical domain or a customer service domain. Each template includes a list of data types relevant to that domain, and the templates are parameterized relative to the domain of the question input to the QA system. For each type of data, the quality such as resolution, the quantity, such as the volume, are parameters that the QA system can fill in to specify the details of desired data collection. The policies may include constraints on data collection, such as which devices owned by which users could be used to collect what types of data, under what time of the day, or at which locations. Such policies ensure that the user and QA system preferences are respected.

Other suitable forms of the semantic interpreter include translation of the question to a data collection specification by a knowledge based expert system. The knowledge based expert system uses ontology to describe different aspects of information needed in answering the question and how these different aspects relate to each other. For each piece of information, additional descriptions of what kind of data are relevant and which analytics can produce the information from the data can be included. For each category of question, such ontology can be built. The expert system examines the ontology to find out which data are needed to answer a given question and constructs data collection specifications, sending these data collection specifications to the data collection infrastructure to obtain the desired data. The data and event collection specification is produced using the context of the question that the QA layer is attempting to answer. The raw data collected can be translated based on the data and event collection specification. The raw data can be further processed by analytics such that the output is information at a higher semantic level that can be used to answer the question. The information can be transformed into appropriate forms, e.g., text or tables. This enables the underlying mobile data collection system to turn the real time data into information that QA application layer can consume.

DETAILED DESCRIPTION

Figure 1:
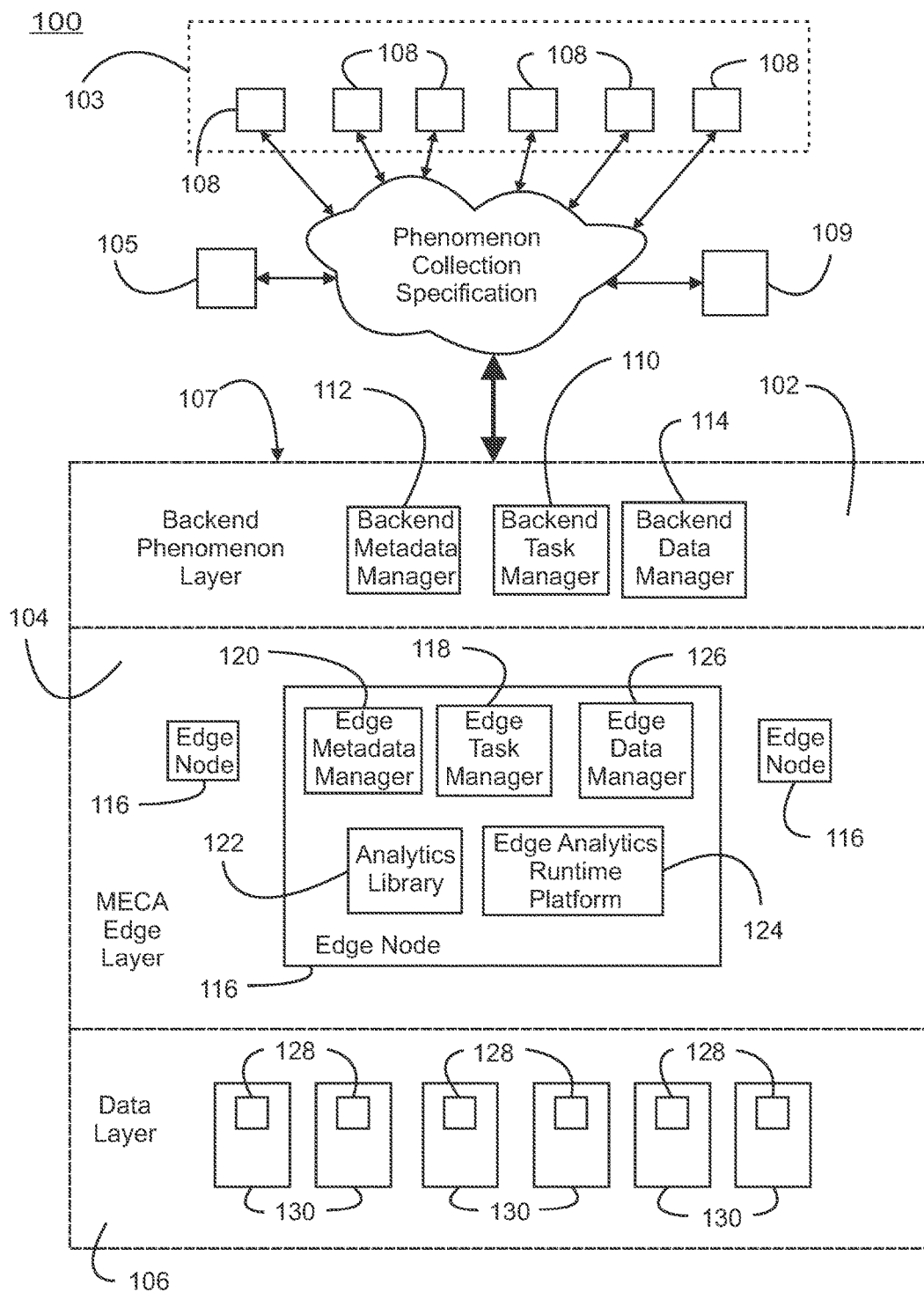
FIG. 1 is a schematic representation of an embodiment of a question answering data capture system in accordance with the present invention.

Systems and methods in accordance with the present invention leverage mobile edge capture and analytics (MECA), which is a common middleware for data collection from data collection devices such as mobile devices that overcomes the shortcomings of previous attempts to provide data to requesting applications in or to provide for question answering in real time for questions submitted as natural language queries. MECA supports a diverse variety of data and information needs from many different applications running on computing systems, providing a high level abstraction of phenomenon, such that applications can easily express data and information needs declaratively. MECA identifies common data and information needs across different applications. This cross application identification ensures that the raw data collection and primitive processing of raw data is executed once, and the results are shared among these applications. Sharing of common raw data and phenomena across applications avoids the redundancy and conflicts found in the vertical approaches.

MECA uses a configurable framework to select and configure data collection devices based on the requirements from one or more applications as expressed, for example, in natural language queries. An instance of a common software agent capable of real-time collection of different types of data runs on each one of the data collection devices. Each common software agent receives instructions from MECA and obtains and sends back the desired raw data. MECA conducts optional primitive processing on the raw data throughout the data capture system, for example at an edge layer, to extract higher level information, for example, in the form of phenomena. The raw data subjected to primitive processing is converted into phenomenon data, which is communicated back to the requesting applications, e.g., through a phenomenon layer. In general, the various functionalities of the present invention can be provided in one or more layers of the data capture system and are not limited to a given layer or layers. The raw data can also be translated based on the data or event collection specification. Analytics can be used to process the raw data in order to output the information in the raw data at a higher semantic level that answers the question submitted in the natural language query. This higher semantic level includes, but is not limited to, natural language responses, charts, tables and graphs.

The enables MECA to turn the real time data into a natural language that the question answering systems can consume.

MECA provides a common infrastructure to collect real time data for different applications simultaneously. Questions are submitted to one or more applications running on one or more computing systems that are in communication with MECA. These questions are submitted as natural language queries that are then translated into data collection specifications by a semantic interpreter. These data collection specifications are utilized by MECA to obtain responsive real time raw data from various layers and locations of the data capture system. Preferably, the real time raw data are obtained from edge devices of the data capture system. The middleware in MECA exposes a high level abstraction to applications, enabling these applications to express data collection specifications declaratively using phenomenon collection specifications. Each phenomenon is the occurrence of a certain kind of event at a particular physical or geographical location in real time or over a given period of time. For example, the detection of a pothole on a road at a certain location and time is a phenomenon. The use of phenomena provides information at semantic levels higher than the raw data as captured directly by the physical sensors located on a plurality of data generating networked devices. This high level abstraction is motivated by the fact that the raw data generated by physical sensors on devices usually are high volume and not directly consumable by applications and that different applications, especially those in the same domain, may have common information needs.

For example, a public facility maintenance application needs to detect potholes on a road so that proper repairs can be done on time. The natural language query "Identify the location of all potholes along state road 101" is entered into the public facility maintenance application by an entity such as a maintenance operator. Potholes can be detected from the 3-axis acceleration data from smartphones carried by drivers. Therefore, the smartphones of drivers and passengers moving along state road 101 are identified, and the desired 3-axis acceleration data are obtained from those smartphones as long as the driver continues along the desired route, i.e., raw data are obtained as a raw time series or 3-axis acceleration data. However, certain processing on the raw time series data has to be performed to identify the actual location of potential potholes. Such processing is performed within the data capture system of the present invention to improve the semantic level of information and to reduce the volume of data communicated back to the applications in response to the natural language queries. In addition, different applications, especially those in a common domain, may have common information needs. For example, the raw global positioning system (GPS) samples from passengers and drivers in a given vehicle are aggregated to identify their commuting trajectories. These aggregated data are useful for both real time traffic alerts and long term urban road network planning In one embodiment, the raw data collection and primitive processing is shared inside MECA to avoid duplicate efforts in these applications and improve efficiency.

Data collection specifications from a semantic interpreter based on natural language queries submitted through applications running on computing systems, including phenomenon collection specifications, include three parts, an identification of the type of the data or phenomenon needed, the geographic scope or physical location associated with the data or over which that data are collected and the time duration over which data should be collected. Each type of phenomenon has a clear definition of the data structure and semantics. For each type, there is at least one edge analytic that can transform certain kinds of raw data into the phenomenon. These analytics are dynamically invoked by the data capture system, i.e., MECA, on an as-needed basis. The collection of available analytics, and thus phenomenon types, are extensible. Once a new edge analytic is added to the analytics library, the phenomenon type it produces is made available to the requesting applications.

Referring to FIG. 1, in accordance with one exemplary embodiment, the present invention is directed to a question answering and data capture system 100 that includes an application layer 103 and a data capture portion 107 in communication with the application layer. The data capture portion includes a phenomenon layer 102, an edge layer 104 in communication with the phenomenon layer and a data layer 106 in communication with the edge layer. The layers are located on one more suitable computing platforms, for example, computers or servers. The layers can be located on a single computing platform or on two or more distinct and separate computing platforms. In one embodiment, the layers are arranged as a distributed application. In general, these layers are logical and their physical representation may take different forms. For example, the 'edge layer' could be co-located in a cellular base station, but it can also be residing in the backend data center. The layers can be in a single domain or multiple domains. In one embodiment the layers are configured for a data capture system that is configured as a distributed computing system. The layers can be created using one or more software programs or software modules that are running on one or more suitable computing platforms.

The application layer includes at least one and preferably a plurality of applications 108 running on one or more computing systems or computing platforms. These computing systems can be external to the data capture portion or can be the same computing systems on which the layers of the data capture portion are executing. The applications receive natural language queries from users of the applications or generate natural language queries based on either the execution of the application or inputs from other applications or devices. Also included in the question answering and data collection system 100 are at least one sematic interpreter 105 and at least one raw data translator 109. The semantic interpreter and raw data collector can be executing on separate computing platforms or can be running on one or more of the layers of the system including the application layer, the phenomenon layer and the edge layer.

The semantic interpreter is in communication with the applications and translates the natural language queries received at the applications into the data request specifications that can be handled by the data collection portion. Each data request specification includes an identification of the types of data to be obtained that are responsive to the natural language query. In one embodiment, the phenomenon layer 102 receives the data request specification and generates data collection requirements responsive to the data request specifications. The edge layer 104 receives the data collection requirements from the phenomenon layer and identifies the raw data required to satisfy the data collection requirements. A plurality of identical common software agents 128 executing on one of a plurality of data generating networked devices 130 in the data layer obtain the identified raw data required to satisfy the data collection requirements. The raw data translator processes the raw data into higher level semantics that are then communicated back to the applications in response to the natural language queries.

The semantic interpreter uses the contents, e.g., words, phrases and alpha-numeric strings, of the natural language query to determine the data request specification that is forwarded to the data collection portion. In one embodiment, the semantic interpreter also utilizes profile information about the entity that submitted the natural language query in addition to the contents of the natural language query in identifying the types of data to be obtained that are responsive to the natural language query. This profile information can be obtained for an entity using the application to submit the natural language query. Suitable entities include, but are not limited to, individuals, business and governmental agencies using the applications. In one embodiment, the profile information is maintained by the application or stored in a database and is provided by the application in combination with the natural language query entered by the entity. Suitable profile information includes, but is not limited to, an identification of the entity, an identification of subject matter associated with the entity, a technical area associated with the entity, a history of previous queries and query responses associated with the entity, an identification of related entities, data acquisition policies associated with the entity and security permissions associated with the entity.

In one embodiment, the semantic interpreter includes a plurality of subject matter domain templates. The subject matter domain describes the contents of the natural language query. Suitable subject matter domains include, but are not limited to, technology, medical, legal, governmental, public safety, tactical, disaster response, emergency, law enforcement, education, sports and transportation. Each subject matter domain template includes a pre-defined list of types of data relevant to a given subject matter domain and a set of parameters for each type of data in the pre-defined list of types of data. The parameters provide descriptive quantities and qualities for different types of data. Preferably, the set of parameters provides adjustable qualities and quantities for the types of data. These qualities, e.g. the resolution, accuracy, veracity and age, and quantities, e.g., data volume, can be adjusted based on inputs from the application or entity that entered the natural language query and express the acceptable quality and quantity of data returned in response to the query. In one embodiment, the semantic interpreter receives inputs from the application regarding preferred qualities and quantities for each type of data and adjusts the qualities and quantities of each type of data in accordance with the received inputs. Having set the desired parameters for the raw data, the common software agents obtain the identified raw data in accordance with the adjusted qualities and quantities, i.e., parameters, of each type of data.

The semantic interpreter identifies the subject matter domain or subject matter domains associated with the natural language query. This can be accomplished by parsing the natural language query and identifying key words or phrases associated with the given subject matter domain. Having identified at least one subject matter domain associated with the natural language query, the semantic interpreter identifies a subject matter domain template from the plurality of subject matter domain templates corresponding to the subject matter domain associated with the natural language query. This corresponding subject matter domain template is then used by the semantic interpreter to create the data request specification.

In one embodiment, the semantic interpreter creates the data request specification and the common software agents obtain the raw data in accordance with one or more policies. In one embodiment, the system, e.g., the semantic interpreter, includes a plurality of data collection policies. Each data collection policy contains a predetermined constraint on data collection, e.g., an identification of which edge devices owned by which users can be used to collect what types of data, under what time of the day and at which locations. Therefore, the policies represent limitations on the data generating networked devices that can be used to obtain real-time raw data, temporal limitations on data collection and spatial limitations on data collection. The common software agents obtain the identified raw data in accordance with the identified data collection policies. The policies can be used regardless of the subject matter domain of the natural language query or the identification of the entity submitting the query. Alternatively, each data collection policy is associated with one of the subject matter domains.

In addition to pre-defined templates that are used to construct the data request specifications, the semantic interpreter can utilize expert knowledge about given subject matter domains. In one embodiment, the semantic interpreter includes a knowledge based expert system that includes a plurality of subject matter domain experts. Each subject matter domain expert corresponds to a given subject matter domain and is configured to create the data request specification for natural language queries encompassing that subject matter domain.

Figure 3:
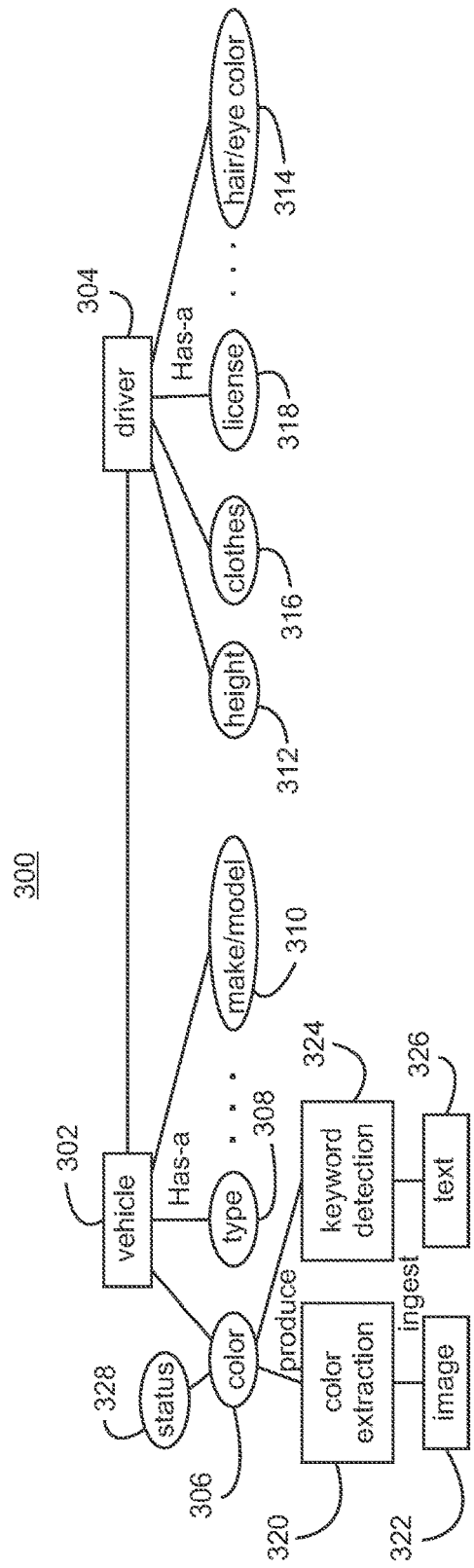
FIG. 3 is a schematic representation of an embodiment of an ontology that is used to create a data request specification in response to a natural language query.

Ontologies are used to expand the scope of the raw data to be acquired in response to a given natural language query. For example, new or additional queries can be constructed. A given ontology can be saved and reused again for future queries. Referring to FIG. 3, an exemplary ontology 300 is illustrated. This ontology can be generated or used in response to a natural language query asking for "the vehicles and drivers located along a given road." In general, an ontology describes relationships among concepts and the various attributes of those concepts. In the example query, the concepts are vehicle 302 and driver 304. Attributes for the vehicle include color 306, type of vehicle 308 and make and model of the vehicle 310 among others. The color can be determined using color extraction technology 320 using an image 322 of the vehicle from and image capture device or using keyword detection 324 based on a text description 326 of the vehicle. Attributes for the driver include height 312, hair and eye color 314, clothing 316 and license information 318 among others. This ontology is saved and used repeatedly for natural language queries over the same attributes. The ontology also provides for the status 328 of any given attribute, i.e., obtained or not obtained, and an expression of the confidence or the reliability of the knowledge. The data acquisition portion then formulates a data acquisition plan based on a determination of the missing information and the raw data that can provide the missing information.

In one embodiment, the system includes an ontology builder disposed within or in communication with the semantic interpreter. The ontology builder specifies relationships among concepts and attributes of those concepts. The semantic interpreter identifies a concept in the natural language query. Suitable concepts include, but are not limited to, physical objects, including persons, and physical phenomena. This concept represents at least a portion, e.g., single word or phrase, from the natural language query, which can be obtained by parsing the natural language query. The semantic interpreter uses the ontology builder to build an ontology corresponding to the concept. This ontology is used to describe the data request specification. Using the ontology to describe the data request specification includes using the ontology to identify attributes of the concept and identifying the types of data available to obtain information about the identified attributes.

Status or state information regarding the information that has already been obtained and placed in the ontology is also used by the question answering and data acquisition system. For example, the edge layer can identify information about the identified attributes that has not been obtained, and the common software agents use the identified types of data to obtain the raw data corresponding to the identified information about the identified attributes that has not been obtained.

The phenomena layer 102 resides at the backend, e.g., a data center, and is responsible for receiving phenomenon collection specifications from the semantic interpreter based on natural language queries received at the applications in the application layer, for coordinating the overall data collection according to the stated policies, and for sending back both raw data and the phenomenon data to the applications and users submitting the natural language queries. In one embodiment, the phenomenon layer is configured to receive the data request specifications from the semantic interpreter and to generate data collection requirements responsive to the data request specifications. Each data request specification includes an identification of types of data, a time duration for collection of the types of data and physical locations associated with the types of data as requested and desired in a natural language query received at a given application. Suitable physical locations include, but are not limited to, geographical locations, polygons in coordinates, postal address and road segments. In one embodiment, the data request specifications are phenomenon collection specifications. Each phenomenon collection specification includes an identification of at least one phenomenon desired by a user of an application executing on a computing system, and each phenomenon is an occurrence of a given event at a given physical location over a given period of time. Therefore, users of applications can request data using a higher level language facilitated by phenomena and are not required to identify actual raw data. The data collection requirements generated at the phenomenon layer in response to the data request specifications include raw data and phenomena, where each phenomenon represents an occurrence of a given event at a given physical location over a given period of time and is generated from the real-time raw data.

In one embodiment, the phenomenon layer includes a Collection Task Manager (CTM) 110, a Backend Metadata Manager (BMM) 112 and a Backend Data Manager (BDM) 114. The collection task manager is configured to provide an interface for the semantic interpreter and applications running on computing systems to submit data request specifications and to forward the generated data collection requirements to the edge layer. The backend metadata manager is configured to maintain metadata regarding phenomena capable of being generated at the edge layer by each edge node and a physical location coverage associated with each of those nodes. The backend data manager is configured to receive raw data obtained from the data generating networked devices and phenomena generated in the edge layer using the raw data, to aggregate the received raw data and phenomena and to communicate the raw data and phenomena to the semantic interpreter that submits data request specifications or applications that receive the natural language queries. In one embodiment, the collection task manager is also configured to maintain state information, e.g., collected or pending, for data collection tasks initiated at the edge layer to satisfy the data collection requirements.

In operation, the CTM exposes an interface to the semantic interpreter and applications to receive their phenomenon collection specifications. Upon receiving a specification, the CTM queries the BMM, which maintains metadata about edge nodes, including which phenomenon types are available, and the respective geographic scope. The CTM then selects appropriate edge nodes within the edge layer, sends the specification to these selected edge nodes so that the edge nodes can start data collection in real time. The CTM creates and maintains the state information for each collection task, for example, an identification of which edge nodes are involved in data collection. When a data collection task finishes either due to the end of the time window for data collection as specified by the application request or termination by the application, the states are cleared. The BDM is responsible for receiving and aggregating data, including raw data and phenomena, from edge nodes, such that data intended for one collection task are continuously provided to the application submitting the natural language query.

In one embodiment, the edge layer resides on the network edges, e.g., base stations in cellular networks. In general, the edge layer is a logical concept, and the physical manifestation of the edge layer in the data capture system takes different forms, e.g., at base stations or at backend or cloud data centers. The edge layer receives collection requirements from the phenomena layer, manages the data collection among a subset of local data collection devices and runs edge analytics for primitive data processing. In one embodiment, the edge layer is in communication with the phenomenon layer and is configured to receive the data collection requirements and to identify raw data required to satisfy the data collection requirements. In one embodiment, the edge layer includes a plurality of edge analytics. Each edge analytic processes raw data obtained from common software agents to generate at least a portion of the phenomena contained in the data collection requirements where each phenomenon is an occurrence of a given event at a given physical location over a given period of time and generated from raw data.

In one embodiment, the edge layer includes a plurality of separate and distinct edge nodes 116. Each edge node individually or the edge layer in general includes an edge task manager 118 configured to maintain state information for data collection tasks initiated to satisfy the data collection requirements and an edge metadata manager 120 configured to maintain registration and status information for each one the of the plurality of data generating networked devices. The registration and status information includes a present location of each data generating networked device and a present energy level for each data generating networked device. The edge layer further also includes an edge analytics library 122 containing a plurality of edge analytics. Each edge analytic processes raw data obtained from common software agents to generate phenomena contained in the data collection requirements where each phenomenon is an occurrence of a given event at a given physical location over a given period of time and generated from raw data.

In one embodiment, the edge layer also includes an edge analytics runtime engine 124 configured to run edge analytics. An edge data manager 126 is provided in the edge layer and is configured to aggregate the identified raw data obtained from common software agents and to communicate the aggregated identified raw data to the backend data manager in the phenomenon layer. In general, the edge layer is responsible for the data collection from an identified set of data collection devices and for running edge analytics for primitive processing required by the specified phenomena.

The various functional portions of the edge layer can be located in a single location and shared by all edge nodes within the edge layer or can be located on each edge node.

In operation, the edge task manager (ETM) maintains the state information about collection tasks at the network edge, e.g., which sensing activities on which devices are involved for which task, and coordinates the device activities and edge processing. The edge metadata manager (EMM) maintains registration and status information about data collection devices, such as their locations and energy levels, and the edge analytics library maintains a collection of edge analytics for the ETM to invoke. The edge analytics runtime platform is a container in which to deploy edge analytics, and the edge data manager (EDM) aggregates data from different devices intended for the same collection task and sends that data to the backend data manager in the phenomenon layer for further aggregation. Upon receiving the data collection requirements from the phenomena layer, the ETM first queries the EMM to identify which edge analytics can produce the required phenomena, and which data collection devices can produce the raw data needed. Then based on the locations, energy levels, and the cost of data collection and processing, a set of data collection devices is chosen, and data collection instructions are sent to those data collection devices. If an edge analytic is required for primitive processing, the ETM invokes the analytic from the library and runs it on the edge analytics runtime platform.

The data layer includes a plurality of identical common software agents 128. Each common software agent is executing on one of a plurality of data generating networked devices 130 and is in communication with the edge layer. The common software agents are configured to obtain the identified raw data required to satisfy the data collection requirements. In one embodiment, the commons agents are identical across different data generating networked devices. However, the common agents do not need to be identical on different types of data generating networked devices. In general, the common agents speak the same protocol understood by their network edge node to which they are connected. Suitable data generating networked devices include cellular phones, smartphones, tablet computers, desktop computers, laptop computers, personal digital assistants, radio frequency identification systems, radar systems, nodes in a mobile adhoc network, surveillance cameras, radio transceivers, telematics devices, package tracking systems, databases or combinations thereof. Each one of the plurality of data generating networked devices is registered on one of the edge nodes. In one embodiment, the edge layer includes a plurality of edge nodes in a network, and each edge node is in communication with at least one of a plurality of the software agents running on the plurality of data generating networked devices. In one preferred embodiment, the edge nodes are base stations in a cellular telephone network, and the data generating networked devices are cellular network communication enabled devices.

In one embodiment, the data layer is the instances of the common software agent running on all of the data generating networked devices. The data layer receives configuration and collection instructions from the edge layer and sends back data generated by physical sensors on the data generating networked devices. Each data generating networked device registers with an edge node, e.g., physically closest edge node, to make itself available for data collection. In addition, each data generating networked device reports the types of raw data it is capable of producing and periodically updates the edge node about its location and energy level such that the edge node can make a proper selection and configuration determination when a data collection requirement is received. The raw data from data generating networked devices are sent to the EDM for aggregation. If an edge analytic was invoked, this analytic takes the raw data or aggregated data and transforms them into the desired phenomenon. Such phenomena are passed to the BDM at the backend and eventually sent back to applications. Therefore, the MECA of the data capture system facilitates sharing of both the raw and phenomenon data across applications. When the same kind of phenomenon data is requested multiple times at one edge node, the existing collection and processing activities will be reused as much as possible. The raw data are also communicated to the raw data translator for translation into the desired higher level semantics. Raw data from a data generating networked device, phenomenon data from edge analytics and translated raw data at higher semantic levels are sent to the EDM and shared by multiple applications.

In one embodiment, the data capture system includes a phenomenon layer configured to receive data request specifications and to generate data collection requirements responsive to the data request specifications. Each data request specification includes an identification of types of data, a time duration for collection of the types of data and physical locations associated with the types of data. The system also includes an edge layer in communication with the phenomenon layer and containing a plurality of nodes where each node is a base station in a cellular network and is configured to receive the data collection requirements and to identify raw data required to satisfy the data collection requirements. A plurality of identical common software agents is included in the system. Each common software agent is executing on one of a plurality of data generating networked devices and in communication with the plurality of nodes in the edge layer. Each data generating networked device is a cellular network communication enabled device and the common software agents and is configured to obtain the identified raw data required to satisfy the data collection requirements from the cellular network communication enabled devices.

In one embodiment, each cellular network communication enabled device includes physical sensors, and the raw data are data obtained from these physical sensors. The system can also include a plurality of edge analytics disposed on the plurality of nodes in the edge layer. Each edge analytic is configured to process raw data obtained from the common software agents to generate phenomena contained in the data collection requirements, where each phenomenon represents an occurrence of a given event at a given physical location over a given period of time. In one embodiment, the plurality of nodes in the edge layer also include edge nodes in additional, i.e., non-cellular, communication networks, and the data generating networked devices further comprise at least one of tablet computers, desktop computers, laptop computers, personal digital assistants, radio frequency identification systems, radar systems, nodes in a mobile adhoc network, surveillance cameras, radio transceivers, telematics devices, package tracking systems and databases in communication with the edge nodes in the additional communication networks.

Figure 2:
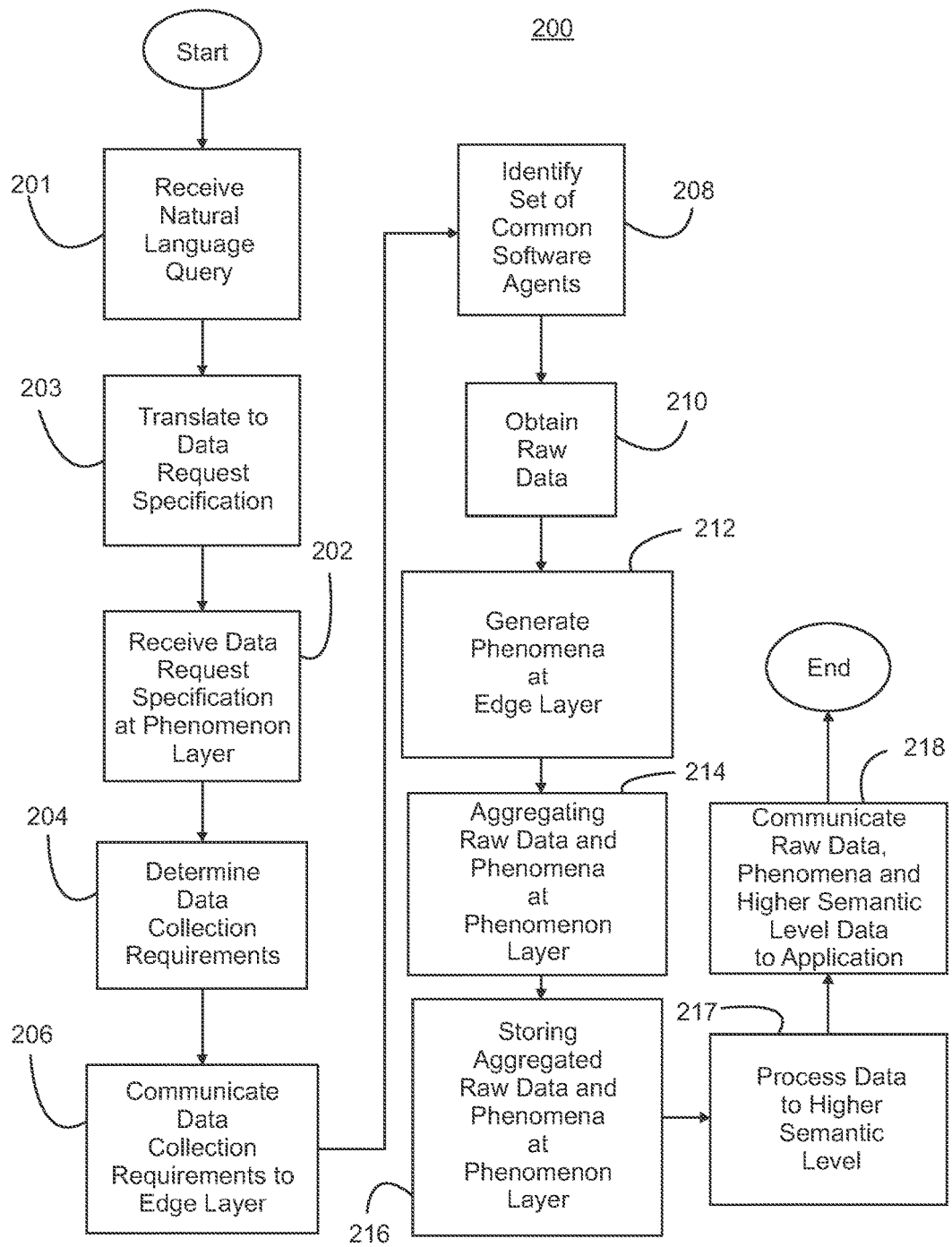
FIG. 2 is a flow chart illustrating an embodiment of a method for using the question answering and data capture system of the present invention to obtain raw data and phenomena from data generating networked devices in response to natural language queries.

Referring to FIG. 2, one exemplary embodiment of the present invention is directed to a method for query answering and data collection using networked devices 200. A natural language query is received 210 at an application running on a computing system. The natural language query is received from an entity, e.g., a user of the application, another application or the application itself.

The natural language query is transmitted to the semantic translator and translated into a data request specification 203 that can be processed at the phenomenon layer. The data request specification includes an identification of types of data to be obtained that are responsive to the natural language query. In one embodiment, profile information is obtained or maintained by the semantic interpreter for the entity submitted the natural language query. This profile information can be used in translating the natural language query into the data request specification by identifying the types of data to be obtained that are responsive to the natural language query.

Each natural language query can related to one or more subject matter domains. Therefore, translating the natural language query into the data request specification include identifying at least one subject matter domain associated with a given natural language query. A corresponding subject matter domain template is used by the semantic interpreter to create the data request specification. This corresponding subject matter domain template contains a pre-defined list of types of data relevant to the corresponding subject matter domain and a set of parameters for each type of data in the pre-defined list of types of data. Each set of parameters has adjustable qualities and quantities for the types of data. Therefore, the set of parameters for each type of data are set by adjusting the qualities and quantities of each type of data. When raw data are obtained, they are obtained responsive to the adjusted qualities and quantities of the types of data in the data request specification. Therefore, a proper volume of data of an acceptable accuracy can be obtained in response to the natural language query.

Policies can be used to govern data collection. These policies include limitations on data generating networked devices that can be used to obtain the raw data, temporal limitations on data collection and spatial limitations on data collection. By integrating the policies into the data request specification, the constraints contained in the policy are ultimately provided to the software agents that are collecting the raw data. Therefore, data collection policies are identified and communicated to the semantic interpreter. Each data collection policy represents a pre-determined constraint on data collection. In one embodiment, each data collection policy is associated with one or more of the identified subject matter domains. Therefore, selection of the subject matter domain provides the semantic interpreter with the desired policies. The raw data further are obtained raw data responsive to the types of data in the data request specification and in accordance with the identified data collection policies.

The subject matter domain that is identified by the semantic interpreter in the natural language query can also be used in a knowledge based expert system. The semantic interpreter maintains or is in communication with the knowledge based expert system for each one of the plurality of subject matter domains. The semantic interpreter uses a knowledge based expert system corresponding to the identified subject matter domain to create the data request specification.

Any given natural language query can contain one or more concepts. These concepts represent at least a portion of the natural language query and can include a word, a phrase or an alpha-numeric string. The semantic interpreter identifies a concept, e.g., a physical object or a physical phenomenon, in the natural language query that represents at least a portion of the natural language query, and builds an ontology corresponding to the concept. In particular, the ontology is used to identify attributes of the concept, and the types of data available to obtain information about the identified attributes can be identified. Therefore, this ontology is used to describe the data request specification. When the raw data are obtained, information about the identified attributes that has not been obtained is identified, and the identified types of data are used to obtain the raw data corresponding to the identified information about the identified attributes that has not been obtained.

A data request specification is received 202 at the phenomenon layer of the data capture system from an application running on a computing system. This data request specification includes an identification of the types of data desired by that application, a time duration for collection of the types of data and physical locations associated with the types of data. Preferably, the data collection specification is received as a phenomenon collection specification that includes an identification of at least one phenomenon desired by the application.

Data collection requirements are determined at the phenomenon layer 204. These data collection requirements are responsive to the data request specification and include raw data and phenomena responsive to the data request specification. Each phenomenon, as described above, describes an occurrence of a given event at a given physical location over a given time duration. The data collection requirements are then communicated to the edge layer 206 of the data capture system. In one embodiment, the edge layer contains a plurality of edge nodes, and an identification of phenomenon types supported and physical locations covered by each edge node is maintained at the phenomenon layer. Therefore, the data collection requirements are communicated from the phenomenon layer to appropriate edge nodes based on the identified phenomenon types, the covered physical locations or both. In addition, state data for the data request specification can be maintained at the phenomenon level. These state data monitor, for example, the progress of a given data request and are cleared upon termination of the data request specification. Suitable state data include, but are not limited to, a remaining time duration for data collection responsive to the data request specification and an identification of edge nodes within the edge layer involved in the data collection.

A set of common software agents within the data capture system capable of obtaining raw data sufficient to satisfy the data collection requirements are identified at the edge layer in the data capture system 208. This set of common software agents can be a subset of all available common software agents within the data capture system. Each common software agent is an identical software agent and runs on one of a plurality of data generating networked devices. Therefore, distinct or separate software agents are not required for each device, application or sensor, and the common agents can generate data that is used across and shared among all applications. In one embodiment, the edge layer includes a plurality of edge nodes in a network. Each edge node is in communication with at least one of the plurality of software agents running on the plurality of data generating networked devices. Any suitable network used to establish connectivity and communication among devices can be used including wired or wireless networks using any suitable communication protocol and local area networks and wide are networks. The data generating networked devices used to generate the raw data using sensors contained in or connected to those devices are enabled on the network and are capable of sharing data across the network. Suitable data generating networked devices include, but are not limited to, cellular phones, smartphones, tablet computers, desktop computers, laptop computers, personal digital assistants, radio frequency identification systems, radar systems, nodes in a mobile adhoc network, surveillance cameras, radio transceivers, telematics devices, package tracking systems, databases and combinations thereof. In one embodiment, the network is a cellular telephone communication network. In this embodiment, the edge nodes are base stations in the cellular telephone network, and the data generating networked devices are cellular network communication enabled devices, e.g., cell phones, smart phones, tablet computers.

State information can be maintained at the edge layer for each identified common software agent while that common software agent is obtaining the raw data. In addition, registration and status information is maintained for each data generating networked device. When the edge layer is formed of a plurality of edge nodes, each data generating networked device is registered with one of the edge nodes and communicates the types of raw data available from each data generating networked device to the edge node on which that data generating networked device is registered. Period updates are also communicated from each data generating networked device to the edge node on which that data generating networked device is registered. These periodic updates include location data and energy levels for the data generating networked device.

The identified common software agents are used to obtain the appropriate or responsive raw data. These raw data are then communicated back up through the layers of the data capture system towards the requesting applications. Initially, the raw data pass through the edge layer, and the phenomena in the data collection requirements are generated at the edge layer using the obtained raw data 212. In one embodiment, the edge layer includes a plurality of edge analytics. Each edge analytic is associated with a given phenomenon and capable of being invoked to satisfy the data collection requirements. A given edge analytic can generate an entire phenomenon or can be used to contribute to a portion of one or more phenomena. The edge analytics associated with the phenomena in the data collection requirements are used to generate the phenomena. A plurality of edge analytics is maintained in a library within the edge layer. New edge analytics can be added to the library. These edge analytics can be accessible across the entire edge layer or can be specific to a given edge node within the edge layer. The phenomenon layer maintains a list of the available edge analytics and their location within the edge layer.

The combined raw data and generated phenomena are then communicated to the phenomenon layer. The raw data and phenomena responsive to the data request specification are aggregated at the phenomenon layer 214. In addition, the aggregated raw data and phenomena are stored at the phenomenon layer 216. Since the data are generated by common software agents and edge analytics, they are suitable for use in responding to subsequent data request specifications across all applications. In one embodiment, the raw data are processed into information having a higher semantic level 217. The aggregated raw data, phenomena responsive to the data request specification and processed higher semantic level data are communicated from the phenomena layer to the requesting application 218.

In one embodiment of the method for data collection from networked devices in accordance with the present invention, data request specifications are received at the phenomenon layer of the data capture system from a plurality of applications running on one or more computing systems. Again, each data request specification includes an identification of types of data desired by each application, a time duration for collection of those types of data and physical locations associated with the types of data. The data collection requirements responsive to all of the received data request specifications are determined at the phenomenon layer. These data collection requirements comprising raw data and phenomena responsive to the data request specifications, and the data request specifications received from the applications are preferably in the form of phenomena request specifications. The phenomenon layer, identifies and aggregates the data collections requirements across all requests. Therefore, if different phenomena requested from different applications require the same raw data or if different applications request the same phenomena, then the phenomenon layer does not duplicate raw data and phenomena in the data collection requirements. In one embodiment, two applications can request the same type of data, but at different locations or for different time periods. The phenomenon layer incorporates these requests into the data collection requirements in the most efficient manner, e.g., a single type of data with expanded time or location ranges to cover both requests.

The set of common software agents within the data capture system capable of obtaining raw data sufficient to satisfy the data collection requirements are identified at the edge layer in the data capture system, and these identified common software agents are used to obtain the raw data. The phenomena in the data collection requirements are generated at the edge layer, and the raw data and phenomena responsive to the data request specification are communicated to the phenomenon layer. The phenomenon layer is used to coordinate communication of the phenomena and raw data among the applications based, for example, on an understanding of how the phenomenon layer broke down and aggregated the data collection requests for purposes of efficiency.

In one example, the data capture system is used in a disaster management application that provides services for both individuals and authorities in a chemical spill scenario. The application uses the data and information collected by the MECA, illustrating the benefits of MECA compared to existing vertical approaches including a high level abstraction of phenomena collection specification. The application does not need to interact directly with any of the data generating networked devices, i.e., mobile devices. Unlike the vertical approach, it does not need to be concerned about the dynamic changes such as device mobility and resource variations. MECA handles all those dynamics and makes them transparent to the application. The application only needs to send phenomenon collection specification about the phenomena types, geographical scopes and time durations to MECA.

In addition, concurrent collection of phenomenon and raw data of different types is supported. The application provides an alert service to individuals when they get too close to a danger zone, and warning services for authorities such as the fire department to track the movements of fire fighters. These services require phenomenon and raw data of different types, which are collected by MECA simultaneously. Intelligent and efficient processing is provided at the network edge. MECA has edge analytics that conduct primitive processing on the raw data collected. The resulting phenomenon data has much less volume, and carries higher level semantics that are more easily consumable by the application. In addition, metadata and policy driven device selection and configuration are provided. MECA maintains the metadata of devices such as their locations, and data collection capabilities. There are also policies regarding how devices should be chosen and configured based on their resource levels. MECA selects and configures a subset of devices based on the metadata and policies.

In this example, a disaster management application is developed using data collected from mobile devices. It illustrates the benefits of MECA for social networks in both natural disaster and terrorist attack scenarios. The application sends alert messages to individuals who have subscribed to the system to receive notifications of nearby dangers. Examples include approaching a downed power line, a chemical spill, or radioactive contamination. It also enables the authorities to track the status of emergency response personnel, e.g., if a person does not move for a long period of time, or moves very slowly, it may indicate an injury or difficulty that needs attention. In a chemical spill scenario, an individual notices hazardous material and calls to report the incident. A dispatcher receives the call and collects information such as the type of emergency, location and time when first noticed and informs first responders. Police, HAZMAT, fire fighters, and a medical team are among the responders sent to the area. Police or fire fighters are usually first to arrive, and the first thing they do is to isolated the high-risk area, also known as a "hot zone" from so-called "cold-zones", e.g., the safe area. A small area separates these two zones, which is referred to as a "warm zone."

These zones can be represented on a map as concentric circles, with the "hot zone" being the inner circle and the "warm zone" being an outer circle. Outside the outer circle is the "cold zone". Everyone who enters the hot zone is contaminated and has to go through decontamination process to enter the cold zone. Other responders including the medical team cannot enter the hot zone until it is declared safe by special forces. The fire captain and other team leaders need to keep their team members safe and away from the hot zone. If a person enters the warm zone, an alert message is sent to warn that person from potential danger of chemical exposure. After special forces including HAZMAT clean the area and safely separate contaminated people, they declare the area safe. Hence other first responders including the medical team and fire fighters can enter the area.

From this point forward, it is critical for team leaders to monitor the movement mode of their team members in the response if non-movement or slow motion is detected. The context of this application determines the types of phenomenon that are needed from the MECA middleware. The two phenomena of interest in this scenario and processed from different data types are entering a zone of interest, which utilizes location data from GPS, and a movement mode phenomenon utilizing acceleration data. Decision makers or individuals each specify the phenomenon of interest at a given location and within a time window. They input the phenomenon collection specifications through a user-friendly template by identifying the phenomenon of interest in a rectangular geographical area and a certain time duration. MECA processes the specifications, and identifies edge nodes that are capable of producing these two phenomenon types and whose responsible collection areas overlap with the specified geographical scopes. A subset of suitable edge nodes is selected and the phenomena layer forwards the collection specifications to them. These edge nodes in turn identifies that there exist edge analytics that can produce the movement mode and approaching zone phenomenon, which further require the acceleration and GPS location data from devices as raw data input. Thus the edge nodes instruct these devices for relevant data collection. Finally the data are processed and the phenomena sent to the application, which generates danger zone alerts and movement mode warnings for individuals and authorities.

As will be appreciated by one skilled in the art, aspects of the present invention may be embodied as a system, method or computer program product. Accordingly, aspects of the present invention may take the form of an entirely hardware embodiment or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Methods and systems in accordance with exemplary embodiments of the present invention can take the form of an entirely hardware embodiment, an entirely software embodiment or an embodiment containing both hardware and software elements. In a preferred embodiment, the invention is implemented in software, which includes but is not limited to firmware, resident software and microcode. In addition, exemplary methods and systems can take the form of a computer program product accessible from a computer-usable or computer-readable medium providing program code for use by or in connection with a computer, logical processing unit or any instruction execution system. For the purposes of this description, a computer-usable or computer-readable medium can be any apparatus that can contain, store, communicate, propagate, or transport the program for use by or in connection with the instruction execution system, apparatus, or device. Suitable computer-usable or computer readable mediums include, but are not limited to, electronic, magnetic, optical, electromagnetic, infrared, or semiconductor systems (or apparatuses or devices) or propagation mediums. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Suitable data processing systems for storing and/or executing program code include, but are not limited to, at least one processor coupled directly or indirectly to memory elements through a system bus. The memory elements include local memory employed during actual execution of the program code, bulk storage, and cache memories, which provide temporary storage of at least some program code in order to reduce the number of times code must be retrieved from bulk storage during execution. Input/output or I/O devices, including but not limited to keyboards, displays and pointing devices, can be coupled to the system either directly or through intervening I/O controllers. Exemplary embodiments of the methods and systems in accordance with the present invention also include network adapters coupled to the system to enable the data processing system to become coupled to other data processing systems or remote printers or storage devices through intervening private or public networks. Suitable currently available types of network adapters include, but are not limited to, modems, cable modems, DSL modems, Ethernet cards and combinations thereof.

In one embodiment, the present invention is directed to a machine-readable or computer-readable medium containing a machine-executable or computer-executable code that when read by a machine or computer causes the machine or computer to perform a method for question answering and data collection from networked devices in accordance with exemplary embodiments of the present invention and to the computer-executable code itself. The machine-readable or computer-readable code can be any type of code or language capable of being read and executed by the machine or computer and can be expressed in any suitable language or syntax known and available in the art including machine languages, assembler languages, higher level languages, object oriented languages and scripting languages. The computer-executable code can be stored on any suitable storage medium or database, including databases disposed within, in communication with and accessible by computer networks utilized by systems in accordance with the present invention and can be executed on any suitable hardware platform as are known and available in the art including the control systems used to control the presentations of the present invention.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s) and steps or elements from methods in accordance with the present invention can be executed or performed in any suitable order. Therefore, it will be understood that the appended claims are intended to cover all such modifications and embodiments, which would come within the spirit and scope of the present invention.

What is claimed is:

1. A method for question answering, the method comprising:

generating a plurality of natural language queries at applications running on a plurality of computing systems, each natural language query describing at least one phenomenon comprising an event occurring in real time at a given physical location within a time window that extends over a given duration of real time;

communicating the plurality of natural language queries to common mobile edge capture and analytics middleware in communication with plurality of computing systems running the applications;

translating each natural language query into a data request specification, each data request specification comprising an identification of types of data to be obtained that are responsive to the natural language query and that indicate an occurrence of the at least one phenomenon;

using the mobile edge capture and analytics middleware to identify common data needs across the plurality of applications and to determine data collection requirements in the data capture system responsive to the data request specification, the data collection requirements comprising raw data to be collected by a data capture system comprising a plurality of data capture devices, each data capture device running an instance of a common software agent capable of real-time collection of different types of data and each instance of the common software agent receiving data collection requirements from the mobile edge capture and analytics middleware, the raw data comprising time data within the time window, physical location data and physical sensor data;

using physical sensors located in the data capture devices in the data capture system that are disposed in the given physical location during the time window to obtain the raw data in real time;

using the common software agents to communicate the obtained raw data to the mobile edge capture and analytics middleware;

using the obtained raw data by combining the time data, physical location data and physical sensor data in the mobile edge capture and analytics middleware to identify occurrences of phenomena indicated by the physical sensors;

using the mobile edge capture and analytics middleware to store the time data, physical location data, physical sensor data and identified phenomena for use in responding to data collection requirements from the plurality of applications; and communicating raw data and identified occurrences of phenomena to the plurality of applications.

2. The method of claim 1, wherein:

the method further comprises identifying at an edge layer in the data capture system a set of instances of the common software agent within the data capture system capable of obtaining raw data sufficient to satisfy the data collection requirements, and the plurality of data generating devices comprising mobile communication devices; and using the physical sensors to obtain the raw data further comprises using the identified common software agents to obtain the raw data.

3. The method of claim 1, wherein:
generating the natural language queries further comprises generating the natural language queries for one or more entities;
the method further comprises obtaining profile information for each entity; and
translating the natural language query into a data request specification further comprising using the obtained profile information in identifying the types of data to be obtained that are responsive to the natural language query.

4. The method of claim 1, wherein translating each natural language query into a data request specification further comprises:
identifying a subject matter domain associated with each natural language query; and
using a corresponding subject matter domain template to create the data request specification, the corresponding subject matter domain template comprising:
a pre-defined list of types of data relevant to the corresponding subject matter domain; and
a set of parameters for each type of data in the pre-defined list of types of data, the set of parameters comprising adjustable qualities and quantities for the types of data.

5. The method of claim 4, wherein:
translating each natural language query into a data request specification further comprises defining the set of parameters for each type of data by adjusting the qualities and quantities of each type of data; and
using the physical sensors to obtain the raw data further comprises obtaining raw data responsive to the adjusted qualities and quantities of the types of data in the data request specification.

6. The method of claim 4, wherein:
translating the natural language query into a data request specification further comprises identifying data collection policies associated with the identified subject matter domain, each data collection policy comprising a pre-determined constraint on data collection; and
using the physical sensors to obtain the raw data further comprises obtaining raw data responsive to the types of data in the data request specification in accordance with the identified data collection policies.

7. The method of claim 6, wherein the data collection policies comprise limitations on data generating networked devices that can be used to obtain the raw data, temporal limitations on data collection and spatial limitations on data collection.

8. The method of claim 1, wherein translating the natural language query into a data request specification further comprises:
identifying a subject matter domain associated with the natural language query; and
using a knowledge based expert system corresponding to the identified subject matter domain to create the data request specification.

9. The method of claim 1, wherein translating the natural language query into a data request specification further comprises:
identifying a concept in the natural language query, the concept comprising at least a portion of the natural language query;
building an ontology corresponding to the concept; and
using the ontology to describe the data request specification.

10. The method of claim 9, wherein the concept comprises a physical object or a physical phenomenon.

11. The method of claim 9, wherein using the ontology further comprises:
using the ontology to identify attributes of the concept; and
identifying the types of data available to obtain information about the identified attributes.

12. The method of claim 11, wherein using the physical sensors to obtain the raw data further comprises:
identifying information about the identified attributes that has not been obtained; and
using the identified types of data to obtain the raw data corresponding to the identified information about the identified attributes that has not been obtained.

13. The method of claim 1, wherein:
the method further comprises processing the raw data and the identified occurrences of phenomena into natural language responses; and
communicating raw data and identified occurrences of phenomena further comprises communicating the natural language responses.

14. A computer-readable storage medium containing a computer-readable code that when read by a computer causes the computer to perform a method for question answering, the method comprising:
generating a plurality of natural language queries at applications running on a plurality of computing systems, each natural language query describing at least one phenomenon comprising an event occurring in real time at a given physical location within a time window that extends over a given duration of real time;
communicating the plurality of natural language queries to common mobile edge capture and analytics middleware in communication with plurality of computing systems running the applications;
translating each natural language query into a data request specification, each data request specification comprising an identification of types of data to be obtained that are responsive to the natural language query and that indicate an occurrence of the at least one phenomenon;
using the mobile edge capture and analytics middleware to identify common data needs across the plurality of applications and to determine data collection requirements in the data capture system responsive to the data request specification, the data collection requirements comprising raw data to be collected by a data capture system comprising a plurality of data capture devices, each data capture device running an instance of a common software agent capable of real-time collection of different types of data and each instance of the common software agent receiving data collection requirements from the mobile edge capture and analytics middleware, the raw data comprising time data within the time window, physical location data and physical sensor data;
using physical sensors located in the data capture devices in the data capture system that are disposed in the given physical location during the time window to obtain the raw data in real time;
using the common software agents to communicate the obtained raw data to the mobile edge capture and analytics middleware;
using the obtained raw data by combining the time data, physical location data and physical sensor data in the mobile edge capture and analytics middleware to identify occurrences of phenomena indicated by the physical sensors;

using the mobile edge capture and analytics middleware to store the time data, physical location data, physical sensor data and identified phenomena for use in responding to data collection requirements from the plurality of applications; and communicating raw data and identified occurrences of phenomena to the plurality of applications.

15. The computer readable medium of claim 14, wherein:

the method further comprises identifying at an edge layer in the data capture system a set of instances of the common software agent within the data capture system capable of obtaining raw data sufficient to satisfy the data collection requirements, and the plurality of data generating devices comprising mobile communication devices; and using the physical sensors to obtain the raw data further comprises using the identified common software agents to obtain the raw data.

16. The computer readable medium of claim 14, wherein translating the natural language query into a data request specification further comprises:

identifying a subject matter domain associated with the natural language query;

using a corresponding subject matter domain template to create the data request specification, the corresponding subject matter domain template comprising:

a pre-define list of types of data relevant to the corresponding subject matter domain; and a set of parameters for each type of data in the pre-defined list of types of data, the set of parameters comprising adjustable qualities and quantities for the types of data;

defining the set of parameters for each type of data by adjusting the qualities and quantities of each type of data; and using the physical sensors to obtain the raw data further comprises obtaining raw data responsive to the adjusted qualities and quantities of the types of data in the data request specification.

17. The computer readable medium of claim 16, wherein:

translating the natural language query into a data request specification further comprises identifying data collection policies associated with the identified subject matter domain, the data collection policies comprising limitations on data generating networked devices that can be used to obtain the raw data, temporal limitations on data collection and spatial limitations on data collection; and using the physical sensors to obtain the raw data further comprises obtaining raw data responsive to the types of data in the data request specification in accordance with the identified data collection policies.

18. The computer readable medium of claim 14, wherein translating the natural language query into a data request specification further comprises:

identifying a concept in the natural language query, the concept comprising at least a portion of the natural language query;

building an ontology corresponding to the concept; and using the ontology to describe the data request specification.

19. The computer readable medium of claim 18, wherein the concept comprises a physical object or a physical phenomenon.

20. The computer readable medium of claim 18, wherein:

using the ontology further comprises:

using the ontology to identify attributes of the concept; and identifying the types of data available to obtain information about the identified attributes; and using the physical sensors to obtain the raw data further comprises:

identifying information about the identified attributes that has not been obtained; and using the identified types of data to obtain the raw data corresponding to the identified information about the identified attributes that has not been obtained.

\* \* \* \* \*